UNITED STATES PATENT OFFICE.

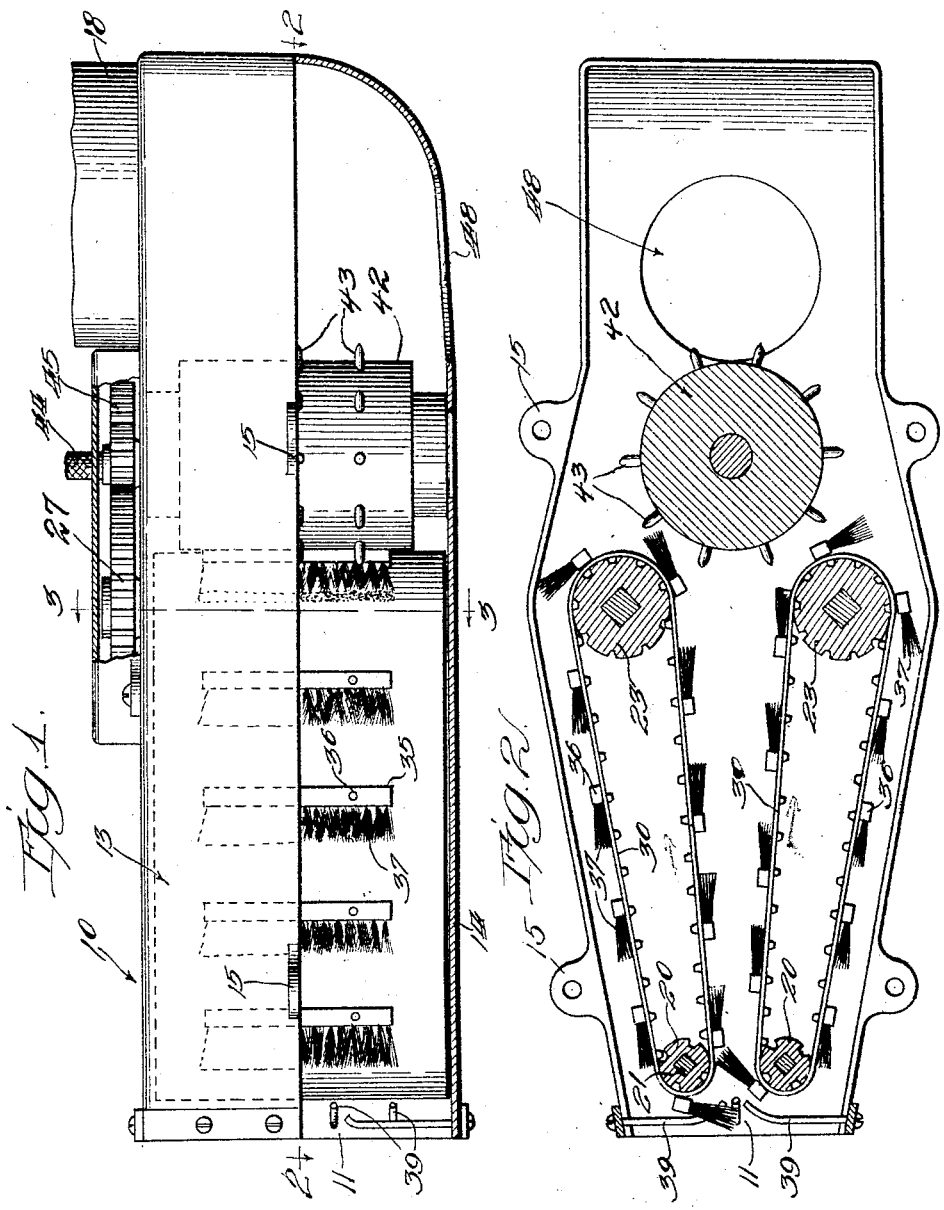

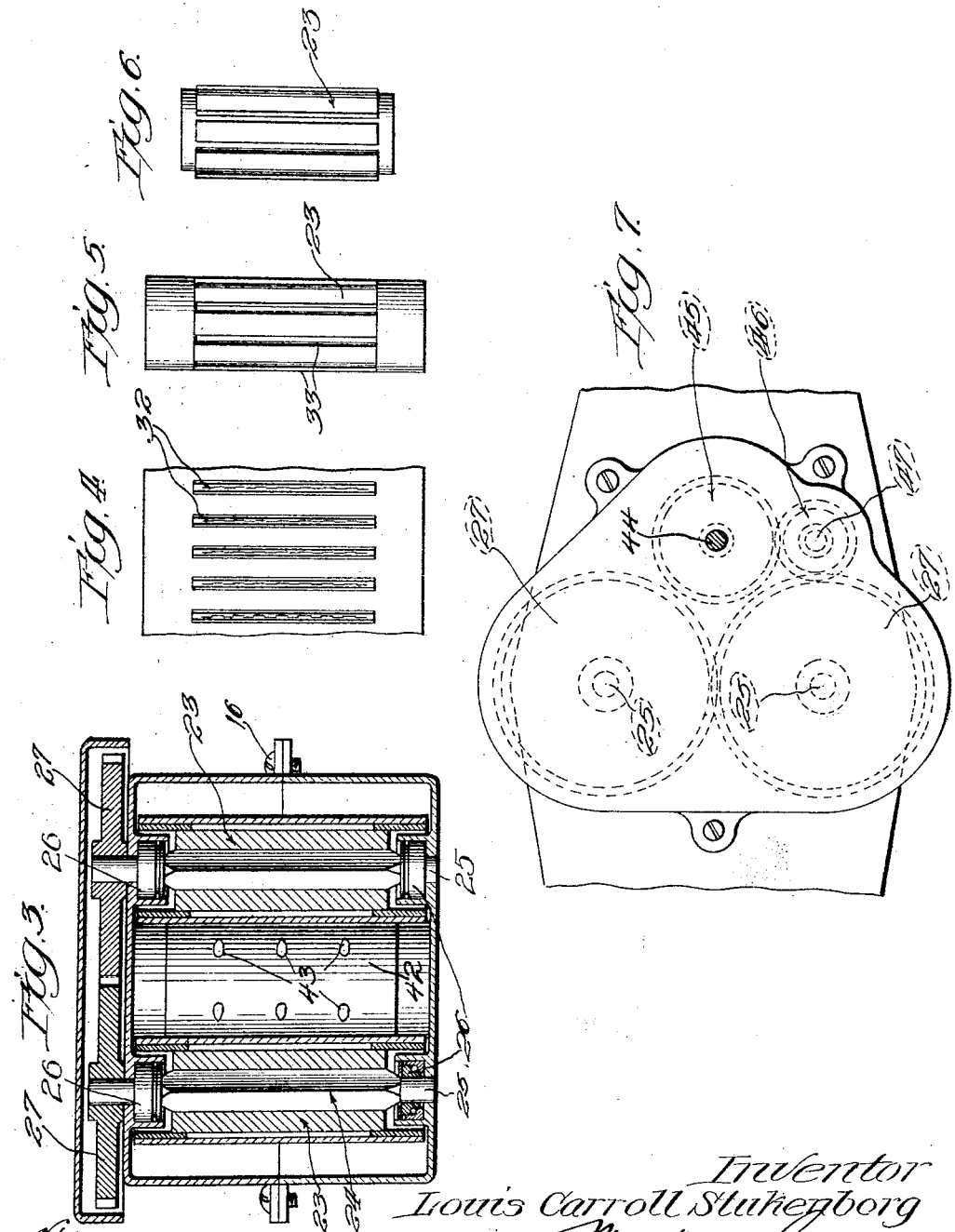

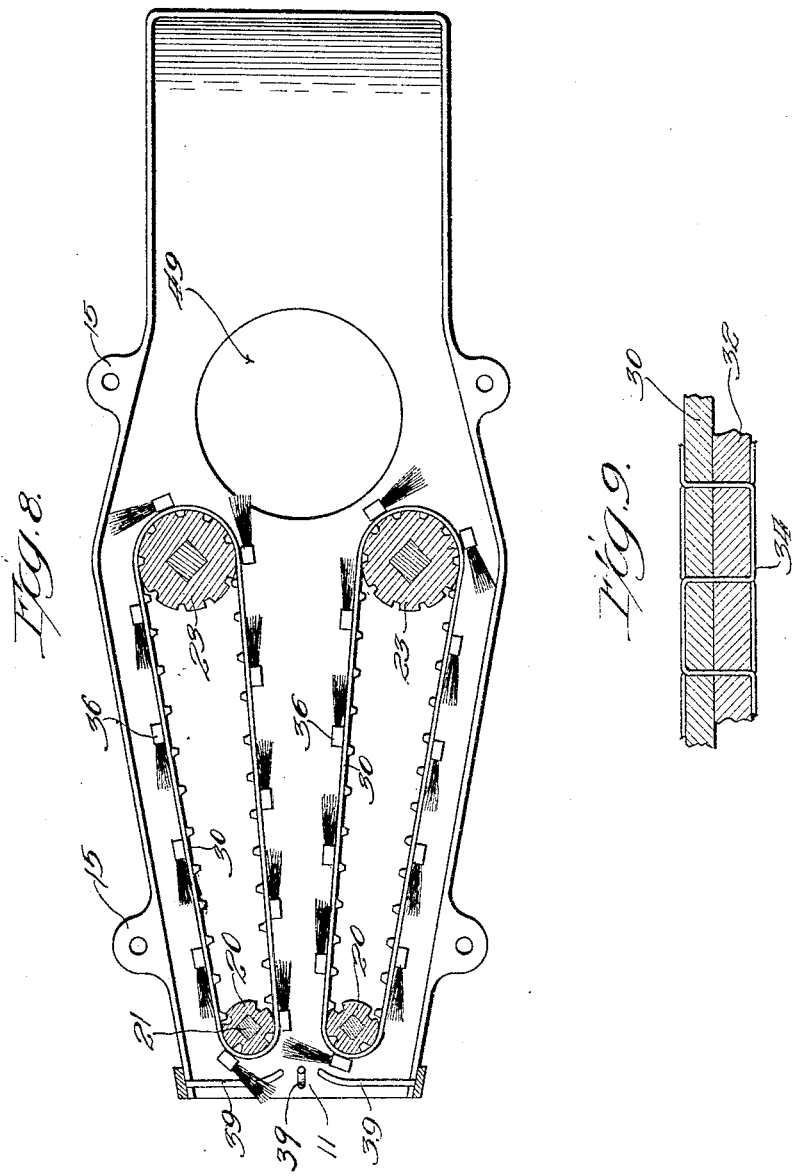

LOUIS CARROLL STUKENBORG, OF CHICAGO, ILLINOIS, ASSIGNOR TO FREDERICK W. STUKENBORG, OF CHICAGO, ILLINOIS.

COTTON PICKING AND HANDLING MECHANISM.

1,404,246.      Specification of Letters Patent.     Patented Jan. 24, 1922.

Application filed May 18, 1920. Serial No. 382,319.

*To all whom it may concern:*

Be it known that I, LOUIS CARROLL STUKENBORG, a citizen of the United States, and a resident of Chicago, in the county of Cook and State of Illinois, have invented certain new and useful Improvements in Cotton Picking and Handling Mechanism; and I do hereby declare that the following is a full, clear, and exact description thereof, reference being had to the accompanying drawings, and to the characters of reference marked thereon, which form a part of this specification.

This invention relates to improvements in machines for picking or otherwise handling cotton and other products of a general like nature adapted to be removed from a plant on which such product is grown, or a mass of such product when not on the plant. For instance, the machine may be employed for picking cotton directly from the plants on the boll, either in the field or after the bolls have been removed from the plant, and likewise may be employed for picking or removing the petals from flowers, such as roses.

The invention refers particularly to improvements in what may be termed the head of the machine wherein the picker mechanism is mounted for cooperative relation to draw the material or product being handled thereinto, to separate it from the picking mechanism, and thereafter to convey the material or product backwardly to a storage receptacle, as by means of the pneumatic action of a suitably arranged exhauster.

The present invention has to do more particularly with those parts of the picking mechanism which directly engage the product or material which is being handled to draw it into and through the picker head, and is a modification of the type of picker mechanism illustrated in my co-pending application for United States patent, Serial No. 382,318, filed of even date herewith.

The picker mechanism embodying said invention is characterized by two endless brush carrying belts which are trained over front and rear pulleys in the picker head with one set of the pulleys lying adjacent to the intake mouth of the head, and with the other set in rear thereof, the product or material being drawn into the head between the front set of pulleys over which the brushes turn to carry them to adjacent laps on the belts; and the material being handled is carried backwardly through the head between such adjacent laps which travel in the same direction. There are means at or adjacent the rear pulleys, which are preferably the driving pulleys, for removing the material or product from the belt brushes and delivering the same into a column of moving air induced through a suction tube connected with the head whereby the material is carried backwardly to a suitable receptacle to receive it.

The improvements embodied in the present application refer more particularly to the manner of mounting the brushes on the endless belts, the arrangement being such as to make it practicable to somewhat reduce the dimensions of the head in which the mechanism is enclosed, as compared to the construction shown in my aforesaid pending application; and the arrangement is also such as to cause the bristles of the brushes to attack the material drawn into the head thereby in a somewhat different manner than by the brushes shown in my aforesaid co-pending application.

In the construction of said co-pending application the brushes have the form of separate bristle tufts that stand out from the belts at substantially right angles to the plane of the belt laps. In the present construction the brushes are arranged to lie transversely across the belt laps, and are solid brushes as distinguished from the tuft brushes shown in my aforesaid application, the bristles of said brushes being connected to holders that are suitably fixed to the belt laps.

The invention consists in the combination and arrangement of the parts shown in the drawings and described in the specification, and is pointed out in the appended claims.

In the drawings:

Figure 1 is a partial plan view and partial sectional view of a picker head embodying my invention.

Figure 2 is a section on the line 2—2 of Figure 1.

Figure 3 is a section on the line 3—3 of Figure 1.

Figure 4 is a detail section of the driving side of brush belts.

Figures 5 and 6 are elevations of the rear and front driving and supporting rollers, respectively, for the brush belt.

Figure 7 is a fragmentary detail illustrating the gearing for connecting the take-off device to the driving pulleys of the brush belt.

Figure 8 is a section similar to Figure 2 showing a modification.

Figure 9 is a fragmentary detail of the belt showing one of the driving ribs thereof.

As shown in said drawings, 10 designates, as a whole, what may be termed the picker head, it comprising an elongated shell which is formed at its front end with a cotton intake mouth 11. Said shell is made of two similar lateral parts 13, 14 which may be aptly described as of general channel shape, and are fitted together at the edges of their flanges where they are provided with lugs 15 through which extend attaching screws 16 to hold the two parts of the shell or casing together.

The shell terminates at its rear end in a laterally directed discharge neck 18 which is adapted to be connected to a flexible pneumatic hose or conveyor which, in the complete machine, leads backwardly to an exhauster to induce a flow of air from the head and through the tube to carry the material backwardly to a suitably placed receptacle to receive the same.

Rotatively mounted in the casing just in rear of the intake mouth 11, are two pulleys 20, 20, the shafts 21 of which are square intermediate their ends for driving connection to the pulleys, the cylindric ends of the shafts being rotatively supported in suitable bearings mounted in opposing walls of the picker head casing, similar to the manner of mounting the rear pulleys 23 which will now be described.

Said pulleys 23 also extend transversely across the picker head casing, and rotate on axes parallel to the axes of the pulleys 20. Their shafts are square intermediate their ends at 24 to fit like cross-section axial openings in the pulleys to afford driving connection between the shafts and pulleys, and the cylindric ends 25 of said shafts are mounted in anti-friction bearings 26 suitably supported on the casing wall. Fixed to the said shafts of the pulleys 23 are gears 27 which mesh with each other whereby the pulleys 23, thus becoming the driving pulleys, are rotated at equal speeds through a driving connection hereinafter described.

The brush belts are best shown in Figures 1 and 2. They each comprise an endless belt portion 30 trained about their appropriate driving and supporting pulleys 23, 20, respectively, and said belts are provided on their inner faces with driving cleats 32 which engage into driving grooves 33 disposed longitudinally along the perimeter of the driving and supporting pulleys, thus imparting to the belts a positive driving connection. Said belts may be made of any suitable flexible material of the required strength and flexibility, canvas being a suitable material, and the driving cleats 32 may be applied thereto by the lines of stitching 34 shown in Figure 9. It will, of course, be understood that tension means may be employed to maintain the belts taut, should they become stretched.

The brush elements of the belt brushes comprise brush holders 35 made of any suitable, preferably non-rigid material, that is fastened in any suitable manner to the belts, as by means of the rivets 36 and bristles 37, as herein shown, extend continuously from one end of the brush to the other, and tend toward that direction of the belt lap in which said lap travels. With this construction it will be seen that the bristles of the brushes tend forwardly or toward the cotton intake mouth 11 of the head casing in what may be termed non-active laps; that by reason of the relatively fixed relation of the holders 36 to the belt laps, the said bristles extend beyond the pulleys 20 as they approach the plane of the axes of rotation of said pulleys, and travel beyond the same so that said brush bristles extend outwardly beyond the front pulleys 20 and through the guards 39 thereat, to grasp the material being drawn into the head and in the portions of the laps that travel rearwardly from the cotton intake mouth of the head, and that said brush bristles tend or project rearwardly and lie flat against the adjacent unidirectional traveling laps. By reason of the fact that the brushes thus lie flat on the belts when occupying straight portions of the belt laps, and of the consequent fact that the bristles of the brushes extend forwardly beyond the pulleys 20, as said brushes approach and turn about the said pulleys, it will be seen that the brushes will have a peculiar interacting grasping action on a boll of cotton or other material presented to the mouth to draw the material backwardly through the mouth and between the front pulleys.

The cotton or other material thus drawn into the head and between the front pulleys 20 are, by rearwardly directed bristles forced backwardly towards the rear or driving pulleys 23. Preferably, and as herein shown, the axes of the driving and the supporting pulleys 23, 20, respectively, are so disposed that the adjacent laps of the belts diverge from each other from front to rear, thereby loosening the material between the belt laps so that the material may be readily released from the brush belts in rear of the driving pulleys 23. The amount of divergence shown in Figures 2 and 8 is somewhat exaggerated, but this angle will depend somewhat upon the nature of the material being handled, such as the character and length of the cotton staple.

As shown in Figures 1 and 2, the material is drawn away from the brush belts by a doffer roller or take-off device comprising a core 42 and outstanding radial pins 43 which, in the instance shown, are rigid with respect to the core and travel with their ends, describing a circle concentric to the axes of rotation of the take-off device.

The said take-off device may be driven by solid or direct connection to a driving shaft 44, and the gears 27 of the driving pulleys 23 may be driven therefrom, through a toothed gear 45 on the shaft 44 and an idler gear 46 mounted to rotate on a stud 47 fixed to the adjacent wall of the casing.

The casing is provided in rear of the take-off device and at the angle or bend between the discharge neck and casing with an air inlet opening 48, through which a major portion of the air constituting the moving volume of air to carry the material backwardly is drawn into the head and connected neck and suction tube.

In the construction shown in Figure 8, similar parts bear the same reference letters, and this construction is modified in respect of the first mentioned construction by the omission of a take-off device and by the placing of the air intake 49 just in rear of the driving pulleys 23.

I claim as my invention:

1. In a picking machine for the purpose set forth, a head, a driving and a supporting pulley rotatively mounted within the head and extending between opposing walls, a belt trained about said pulleys, the laps of the belt extending and laterally substantially filling the space between said walls, and picker bristles fixed to the belt laps and tending towards the direction of travel of the belt, and occupying less than the full width of the belt.

2. A machine for the purpose set forth comprising a picker head having a forwardly opening intake mouth, front and rear pairs of pulleys within the head, one pair of which is driving pulleys, and one pair located near the mouth, picker means embracing two endless brush carriers trained about said pulleys with their adjacent laps within the head traveling rearwardly a distance away from the intake mouth, and picker elements supported on the carrier laps, embracing brush holders fixed to the laps and bristles which extend toward the directions of travel of said laps.

3. A machine for the purpose set forth comprising a picker head having a forwardly opening intake mouth, endless belts trained about pulleys, driving and supporting pulleys in said head, with their adjacent laps travelling rearwardly away from the intake mouth, holders fixed to the belts and carrying bristles which extend on each belt lap toward the direction of travel of said lap, and a take-off device to remove material being handled from said brushes.

4. A machine for the purpose set forth comprising a picker head having a forwardly opening intake mouth, endless belts trained about driving and supporting pulleys in said head, with their adjacent laps traveling rearwardly away from the intake mouth, holders fixed to the belts and carrying bristles which extend on each belt lap toward the direction of travel of said lap, and a take-off device to remove material being handled from said brushes, the said belt being wider than the brush carrying area thereof to extend laterally beyond said area upon said driving and supporting pulleys.

5. A machine for the purpose set forth comprising a picker head having a forwardly opening intake mouth, endless belts trained about pairs of driving and supporting pulleys with their adjacent laps traveling rearwardly away from the intake mouth, and brush holders fixed to the belts and carrying bristles which extend on each belt lap toward the direction of travel of said lap, said driving and supporting pulleys being arranged to cause the adjacent laps of the belt to diverge rearwardly away from each other.

In witness whereof I claim the foregoing as my invention, I hereunto append my signature this twelfth day of May, 1920.

LOUIS CARROLL STUKENBORG.